United States Patent [19]

Hansen

[11] 4,010,606

[45] Mar. 8, 1977

[54] LATCHING VALVE SHUTOFF SYSTEM

[75] Inventor: Kenneth Peter Hansen, Enfield, Conn.

[73] Assignee: United Technologies Corporation, Hartford, Conn.

[22] Filed: Feb. 2, 1976

[21] Appl. No.: 654,668

[52] U.S. Cl. .................. 60/39.28 R; 415/10; 415/15; 415/17

[51] Int. Cl.² ........................................ F02C 9/08

[58] Field of Search ........ 60/39.02, 39.03, 39.16 R, 60/39.28 R, 39.28 T, 39.14, 223; 415/17, 15, 19, 47; 137/14

[56] References Cited

UNITED STATES PATENTS

| 3,478,731 | 11/1969 | Morton | 417/17 X |
|---|---|---|---|
| 3,691,759 | 9/1972 | Scheerer | 60/39.28 R |
| 3,844,111 | 10/1974 | Fenton | 60/39.28 R |
| 3,874,167 | 4/1975 | Katsume | 60/39.28 R |

Primary Examiner—Clarence R. Gordon
Attorney, Agent, or Firm—John D. Del Ponti

[57] ABSTRACT

An improved automatic fuel shutoff system is provided for a turbine type power plant which incorporates (1) sensing means responsive to a preselected abnormal engine operating condition for initially cutting off fuel flow to the engine and (2) latching means for maintaining the cutoff until engine conditions favorable for a normal restart are obtained.

7 Claims, 1 Drawing Figure

U.S. Patent
Mar. 8, 1977
4,010,606
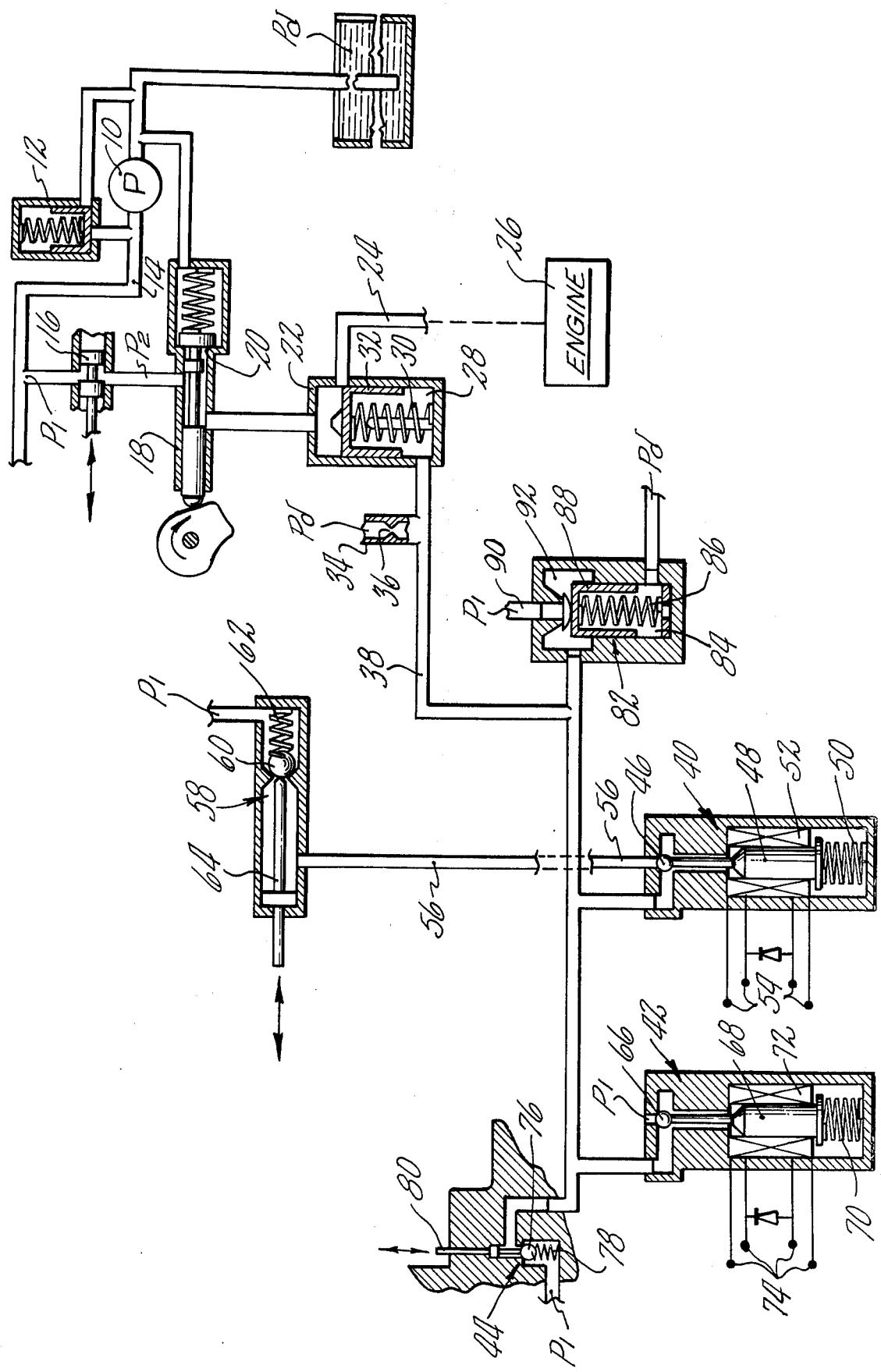

LATCHING VALVE SHUTOFF SYSTEM

BACKGROUND OF THE INVENTION

This invention relates to engine fuel controls and more particularly to fuel controls having means for automatically sensing an engine operating abnormality and, in response thereto, positively shutting off fuel flow to the engine until favorable restarting conditions obtain.

It is known that during starting, or during operation after starting, of an engine such as a gas turbine engine, engine operating abnormalities may occur which require positive shutoff of fuel flow to the engine to prevent damage to the engine itself or to the unit driven thereby. During starting, for example, improper ignition runs the risk of creating a "hot start" wherein excessive fuel collects in the combustion section of the engine which, if ignited, may overheat and damage the engine. Similarly, during engine running, abnormal and potentially dangerous engine conditions may occur, such as overspeed of the gas generator or the free turbine, which require positive shutoff of all fuel flow to the engine.

In addition to rapid and effective initiation of fuel cutoff upon the occurrence of the engine abnormality, there is recognized the need for such cutoff to continue until favorable engine restarting conditions are attained. If fuel cutoff lasts only as long as the engine abnormality, the return of flow will likely be under conditions not conducive to restarting.

SUMMARY OF THE INVENTION

It is an object of the present invention to provide, for a power plant of the type described, a protective system for automatically initiating fuel shutoff in the event of a predetermined engine operating abnormality and for maintaining said shutoff until favorable engine restart conditions obtain.

In accordance with the present invention, there is provided in combination with a turbine type power plant having a combustion section, a fuel control including a fuel pump, a metering valve, main passage means for communicating the fuel from the pump to the combustion section, a pilot-controlled shutoff valve in the main passage means, and an improved automatic shutoff system comprising valve means disposed in the main passage means downstream of the shutoff valve, auxiliary passage means connecting a first source of fluid to the valve means to urge the valve means to a closed position, the fluid being at a pressure higher than the pressure of the fuel in the main passage means, sensing means responsive to an abnormal engine operating signal disposed in the auxiliary passage means blocking flow of the fluid to the valve means when the engine function signal is not received and permitting flow to the valve means when the engine function signal is received, additional passage means connected to the auxiliary passage means between the sensing means and the valve means and communicating the auxiliary passage means with a second source of the fluid at the same pressure, and latching valve means disposed in the additional passage means blocking flow of the fluid from the second source to the auxiliary passage means until the sensing means receives the engine function signal and permitting flow thereafter.

BRIEF DESCRIPTION OF THE DRAWING

An understanding of the invention will become more apparent to those skilled in the art by reference to the following detailed description when viewed in light of the accompanying drawing which is a schematic illustration in partial cross section showing a fuel control having the automatic shutoff system according to the present invention.

DESCRIPTION OF THE PREFERRED EMBODIMENT

Referring to the drawing, fuel at drain pressure $P_d$ is pumped in the known manner through a conventional positive displacement pump 10 provided with a pump relief valve 12 into main line or conduit 14 at increased pressure, $P_1$. The fuel in the main line 14 is metered by a throttle or metering valve 16 and the metered fuel flows at a lower pressure $P_2$, past a pilot-controlled shutoff valve 18 which, upon actuation, provides a dump to drain through port 20. Downstream of the pilot-controlled shutoff valve 18 is a minimum pressure and shutoff valve 22 disposed in line portion 24 of main passage 14 to the combustion section of a turbine type power plant 26.

As indicated, minimum pressure and shutoff valve 22 is disposed in the line 24 downstream of the metering valve and the pilot actuated shutoff valve 18. The valve 22 serves to positively block off fuel from the engine and has the dual function of providing a minimum pressure to the control servos during initial starting and also providing a positive fuel shutoff. Minimum pressure and shutoff valve 22 comprises a chamber 28, spring 30 and valve element 32. Spring 30 biases valve element 32 toward a closed position and the relative strength of this spring and the force responsive area of the valve element created by the pressure acting in chamber 28 determine the pressure $P_2$ in the main line 14 downstream of the metering valve which is necessary for the opening of this valve. As shown in the drawing, a line 34 having a fixed orifice 36 communicates the chamber 28 with drain.

In order to actuate the valve 22 to its shutoff position to block fuel to the engine, an auxiliary line 38 communicates the chamber 28 with a source of fluid at a pressure $P_1$ which, as discussed above, is higher than the pressure $P_2$. As shown, the fluid at $P_1$ is normally blocked from flow to the chamber 28 by a series of engine parameter sensing devices such as a hot start solenoid valve 40, a free turbine ($N_p$) overspeed solenoid valve 42 and gas generator ($N_G$) shutoff valve 44.

As will be appreciated, the solenoid valve 40 comprises a ball 46, core 48, spring 50, windings 52 and electrical lead lines 54. The spring 50 operates to bias the core 48 upwardly to seat the ball 46 and prevent fluid in a line 56, at pressure $P_1$, from reaching line 38. Upon an engine overtemperature condition due to a hot start, an electrical signal energizes the windings 52 to force core 48 downwardly, thus opening the valve 40 so long as the hot start condition exists. In order to prevent actuation of the valve 40 after the engine has been started and has reached idle, a separate valve 58 is provided. The valve 58 comprises a ball 60 biased by a spring 62 to the closed position. A plunger 64, controlled by a speed sensitive servo (not shown) forces the ball to the open position only when gas generator speed is below idle.

Free turbine overspeed solenoid valve 42, shown in the closed position, comprises a ball 66, core 68, spring 70, windings 72 and electrical lead lines 74. Like the hot start solenoid valve 40, the overspeed solenoid valve 42 allows fluid at pressure $P_1$ to reach line 38 only when a preselected abnormal condition is sensed - in this case when a free turbine overspeed causes an electrical signal to energize the winding 72 and cause the core 68 to move downwardly.

The gas generator shutoff valve 44, like the solenoid valves 40 and 42, blocks flow of fluid at pressure $P_1$ until a particular abnormal engine condition is reached. The valve 44 comprises a ball 76 biased in the closed position by a spring 78. A plunger 80, controlled by a servo (not shown) sensitive to gas generator speed forces the ball to the open position only when the gas generator speed reaches a preselected overspeed.

Disposed intermediate the sensing devices 40, 42 and 44 and the minimum pressure and shutoff valve 22 is a latching valve 82. As shown, the latching valve 82 comprises a chamber 84, spring 86 and valve element 88. The valve element 88 is biased upwardly by the spring 86 with a portion of its top surface exposed to pressure $P_1$ in an additional line 90. A chamber 92 communicates the remaining upper surface of the valve element 88 with fluid in the line 38.

In order to aid in the understanding of the present invention, a description thereof during operation of engine 26 is set forth. During engine starting, with the minimum pressure and valve 16 in the open position and fuel flowing to the engine at pressure $P_2$, an abnormal condition such as hot start may occur. In such case, the appropriate hot start solenoid 40 opens and allows flow of fluid at pressure $P_1$ through line 38 to the minimum pressure and shutoff valve 22 and blocks flow to the engine. Simultaneously, the fluid at $P_1$ in line 38 enters chamber 92 and acts on the differential area of the valve element 88 causing it to stroke to the open position. Because of the opening of the latching valve 82 there is now a new source of fluid supply at pressure $P_1$ to maintain the latching valve 82 in the open position and the valve 22 in the closed position regardless of whether solenoid valve 40 remains open. In like manner, during engine operation after starting, an abnormal condition such as overspeed of either the free turbine or the gas generator causes opening of overspeed solenoid valve 42 or overspeed valve 44, respectively. Such opening allows flow of fluid at $P_1$ pressure to close valve 22 and open latching valve 82.

In all of the above situations, the latching valve function is, of course, desirable since the initial sensed condition is typically of short duration and if the valve 22 stops fuel flow to the engine only during the time that the sensed condition exists, full fuel flow would be restored to the engine creating a potentially dangerous condition. Overall, therefore, it can be seen that the unique combination of the latching valve with the sensing devices shuts off fuel flow to the engine until the pilot closes the valve 18 thereby dumping $P_2$ through port to drain. As will be recognized, this results in $P_1$ reducing to a pressure equal to $P_d$ plus the pressure drop across the metering valve 16. At this condition, and with the spring 86 properly sized, the latching valve 82 closes. In addition, shutoff valve 22, because of its spring load, remains closed. At this point, assuming the sensed abnormal conditions have terminated, the engine is in a starting mode and the pilot may safely initiate normal starting sequence.

What has been set forth above is intended primarily as exemplary to enable those skilled in the art in the practice of the invention and it should therefore be understood that within the scope of the appended claims, the invention may be practiced in other ways than as specifically described.

I claim:

1. An improved fuel cutoff system for a gas turbine engine comprising:
   means for supplying a flow of fuel to said engine at a first pressure;
   a pilot-operated shutoff valve;
   valve means movable between an open and a closed position disposed to interrupt said flow of fuel to said engine;
   first means communicating said valve means to a first source of fluid for supplying fluid to said valve means during an abnormal engine operating condition at a second pressure sufficiently high to urge said valve means to the closed position;
   second means actuated by said fluid for communicating said valve means to a second source of said fluid at a pressure at least as high as said second pressure for initially supplying said fluid to said valve means during said abnormal engine operating condition and continually supplying fluid to said valve means to maintain said valve means in the closed position until said engine is in a starting mode.

2. The invention of claim 1 wherein said second pressure is higher than said first pressure.

3. The invention of claim 2 wherein said first means includes at least one valve operable in response to an abnormal engine operating condition to cause flow of said fluid from said first source to said valve means.

4. The invention of claim 3 wherein said abnormal engine operating condition is a hot start overtemperature.

5. The invention of claim 3 wherein said abnormal engine operating condition is a gas generator overspeed.

6. The invention of claim 3 wherein said abnormal engine operating condition is a free turbine overspeed.

7. In a fuel control for a turbine type power plant including a pump for pressurizing fuel, main passage means communicating said pump to the combustion section of said power plant for flowing fuel at a first pressure to said combustion section, a pilot-controlled shutoff valve movable between an open and a closed position in said main passage means, the improvement which comprises an automatic shutoff system comprising:
   valve means disposed in said main passage means downstream of said shutoff valve movable between an open and a closed position;
   auxiliary passage means connecting a source of fluid at a second pressure to said valve means to urge it to said closed position, said second pressure being higher than said first pressure;
   sensing means responsive to an abnormal engine operating signal disposed in said auxiliary passage means blocking flow of said fluid at said second pressure to said valve means when said engine function signal is not received and permitting flow to said valve means while said engine function signal is received;
   additional passage means connected to said auxiliary passage means intermediate said sensing means and said valve means and connecting said auxiliary passage means with a second source of said fluid at said second pressure; and latching valve means disposed in said additional passage means blocking flow of said fluid from said second source to said auxiliary passage means until said sensing means receives said engine function signal and permitting flow thereafter.

* * * * *

UNITED STATES PATENT OFFICE
CERTIFICATE OF CORRECTION

PATENT NO. : 4,010,606
DATED : March 8, 1977
INVENTOR(S) : Kenneth P. Hansen

It is certified that error appears in the above-identified patent and that said Letters Patent are hereby corrected as shown below:

Column 3, line 30      before "valve" should appear -- metering --

Column 3, line 59      after "port" should be inserted -- 20 --

Signed and Sealed this fifth Day of July 1977

[SEAL]

Attest:

RUTH C. MASON
*Attesting Officer*

C. MARSHALL DANN
*Commissioner of Patents and Trademarks*